Patented May 13, 1947

2,420,532

UNITED STATES PATENT OFFICE 2,420,532

PRODUCTION OF CHROMIUM COMPOUNDS

Alan R. Fraser, Sault Ste. Marie, Ontario, Canada, assignor to Chromium Mining & Smelting Corporation, Limited, Sault Ste. Marie, Ontario, Canada, a corporation of Canada No Drawing. Application April 2, 1942,
Serial No. 437,368

4 Claims. (Cl. 23—56)

This invention relates to the production of compounds of chromium and has for an object the provision of an improved method or process for producing such compounds. More particularly, the invention contemplates the provision of an improved method or process for producing such chromium compounds as chromic acid, chromium trioxide and calcium chromate. The invention further contemplates the provision of an improved method or process for recovering chromium from crude chromium-bearing materials in the form of relatively pure chromium compounds such as chromic acid, chromium trioxide and calcium chromate.

The invention is based on my discovery that chromic acid in the liquid state and solid calcium chromate may be produced by subjecting an aqueous solution of calcium dichromate ($CaCr_2O_7$) to an evaporation treatment. Evaporation of a portion of the water of an aqueous solution of calcium dichromate results in concomitant decomposition of the calcium dichromate and the production of chromic acid in liquid condition and a solid precipitate consisting essentially of calcium chromate. Simple boiling of an aqueous solution of calcium dichromate under atmospheric pressure results in the evaporation of excess water and the production of liquid chromic acid ($H_2CrO_4$) (or a saturated aqueous solution of chromium trioxide, $CrO_3$) and solid calcium chromate monohydrate ($CaCrO_4.H_2O$). Similar products may be produced by heating or boiling an aqueous solution of calcium dichromate with elimination of water at pressures lower than atmospheric pressure.

According to a preferred process of the invention, an aqueous solution of calcium dichromate of any suitable concentration and produced in any suitable manner is heated to effect the evaporation and elimination of excess water. As water is eliminated and the concentration of the calcium dichromate solution is increased, solid calcium chromate monohydrate is precipitated. Heating of the solution with elimination of water may be carried out to effect any desired degree of elimination of water with the production of calcium chromate containing one-half or less of the chromium of the calcium dichromate and chromic acid containing one-half or less of the chromium of the calcium dichromate. Elimination of water may be controlled to effect the production of a product consisting essentially of chromic acid and solid calcium chromate monohydrate or a product comprising solid calcium chromate monohydrate and an aqueous solution of chromic acid.

The liquid phase of the product resulting from the evaporation treatment, comprising chromic acid in the liquid state, may be separated from the solid phase, comprising calcium chromate monohydrate by settling and decantation, filtration, centrifuging or other suitable procedure. The solid calcium chromate monohydrate, because of its relatively high solubility in water, preferably is freed of adhering liquid by centrifuging.

The liquid separated from the solid calcium chromate monohydrate may be heated further to effect decomposition of the chromic acid contained therein with evaporation of the water constituent and the production of solid chromium trioxide.

In a complete preferred process of the invention, calcium chromate may be produced by roasting or oxidizing in air a finely divided and intimately mixed charge comprising lime ($CaO$) as such or in the form of limestone ($CaCO_3$), a chromium-bearing material such as chromite ore or ferrochromium and a small amount of soda ash ($Na_2CO_3$) or other oxidation promoter. The components of the charge preferably are in the form of particles small enough to pass a 100-mesh screen, and oxidation preferably is carried out at a temperature in the range 750° C. to 1000° C. The oxidation or roasting treatment results in oxidation of the chromium of the charge from the elemental state or the trivalent state to the hexavalent state with the production of chromium trioxide which combines with the calcium oxide of the lime and the sodium oxide of the soda ash to form calcium chromate and sodium chromate. Any amount of sodium carbonate (soda ash) less than that required to form sodium chromate with all of the chromium of the charge may be employed. Amounts of soda ash from about five percent to seventy-five percent of the amount theoretically required to form sodium chromate with all of the chromium of the charge may be employed advantageously.

The oxidized product resulting from the roasting treatment may be leached with water to dissolve and remove sodium chromate and form a solid residue containing substantially all of the relatively water-insoluble calcium chromate. The calcium chromate-bearing residue may be treated with an aqueous solution of an acid such as carbonic acid or sulphuric acid to convert the calcium chromate to relatively high water-soluble calcium dichromate and substantially water-insoluble calcium carbonate or calcium sulphate. The solution of calcium dichromate thus produced may be subjected to an evaporation treatment to recover calcium chromate and chromic acid.

I claim:

1. The method of producing chromic acid and calcium chromate which comprises evaporating a portion only of the water of an aqueous solution of calcium dichromate with concomitant decomposition of the calcium dichromate and the production of chromic acid in liquid condition and a precipitate consisting essentially of calcium chromate, and separating the chromic acid and calcium chromate.

2. The method of producing chromic acid and calcium chromate which comprises boiling an aqueous solution of calcium dichromate and thereby evaporating a portion of the water of the solution and decomposing the calcium dichromate with the production of chromic acid in liquid condition and a precipitate consisting essentially of calcium chromate, and separating the chromic acid and calcium chromate.

3. The method of producing chromium trioxide and calcium chromate which comprises evaporating a portion only of the water of an aqueous solution of calcium dichromate with concomitant decomposition of the calcium dichromate and the production of chromic acid in liquid condition and a precipitate consisting essentially of calcium chromate, separating the chromic acid and calcium chromate, and heating the chromic acid to eliminate water and form chromium trioxide.

4. The method of producing chromic acid and calcium chromate which comprises subjecting a charge comprising chromium-bearing material, calcium oxide and soda ash to an oxidizing treatment to form a product containing calcium chromate and sodium chromate, leaching the product of the oxidizing treatment with water to form a solution of sodium chromate and a residue containing calcium chromate, treating the residue with an aqueous solution of an acid and forming an aqueous solution of calcium dichromate, evaporating a portion only of the water of the aqueous solution of calcium dichromate with concomitant decomposition of the calcium dichromate with the production of chromic acid in liquid condition with a precipitate consisting essentially of calcium chromate, and separating the chromic acid and calcium chromate.

ALAN R. FRASER.

REFERENCES CITED

The following references are of record in the file of this patent:

UNITED STATES PATENTS

| Number | Name | Date |
| --- | --- | --- |
| 1,926,758 | Udy | Sept. 12, 1933 |
| 1,901,939 | Yetter | Mar. 21, 1933 |
| 2,346,493 | Le Brocq | Apr. 11, 1944 |

FOREIGN PATENTS

| Number | Country | Date |
| --- | --- | --- |
| 11,311 | Great Britain | 1891 |
| 5,948 | Great Britain | 1884 |
| 496,890 | Great Britain | Dec. 7, 1938 |

OTHER REFERENCES

Doerner et al., "A Study of Methods of Producing Chromate Salts from Domestic Ores," Bureau of Mines, bulletin V, Sept. 1939, pp. 6 and 13, 23–56.

Mellor, "Comprehensive Treatise on Inorganic and Theoretical Chemistry," vol. XI, pp. 340–341.

Mellor, "Comprehensive Treatise on Inorganic and Theoretical Chemistry," vol. XI, page 219.

Segerblom, "Properties of Inorganic Substances," 1927, page 41, The Chemistry Catalog Co., Inc., New York, N. Y.